United States Patent
Nakano et al.

(10) Patent No.: US 9,287,590 B2
(45) Date of Patent: Mar. 15, 2016

(54) NON-AQUEOUS ELECTROLYTE SECONDARY BATTERY

(75) Inventors: Tomohiro Nakano, Okazaki (JP); Hideaki Fujita, Kyotanabe (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/255,302

(22) PCT Filed: Feb. 5, 2010

(86) PCT No.: PCT/JP2010/051716
§ 371 (c)(1), (2), (4) Date: Sep. 8, 2011

(87) PCT Pub. No.: WO2011/096069
PCT Pub. Date: Aug. 11, 2011

(65) Prior Publication Data
US 2012/0288737 A1 Nov. 15, 2012

(51) Int. Cl.
*H01M 2/36* (2006.01)
*H01M 10/42* (2006.01)
*H01M 10/04* (2006.01)
*H01M 10/0525* (2010.01)
*H01M 10/0587* (2010.01)

(52) U.S. Cl.
CPC ...... *H01M 10/4235* (2013.01); *H01M 10/0431* (2013.01); *H01M 10/0525* (2013.01); *H01M 10/0587* (2013.01); *Y02E 60/122* (2013.01); *Y02T 10/7011* (2013.01)

(58) Field of Classification Search
USPC .............................. 429/94, 163–168, 129, 186
See application file for complete search history.

(56) References Cited

U.S. PATENT DOCUMENTS

| | | | |
|---|---|---|---|
| 5,434,017 A * | 7/1995 | Berkowitz et al. | 429/94 |
| 6,040,082 A * | 3/2000 | Haas et al. | 429/94 |
| 7,655,347 B2 * | 2/2010 | Nishide et al. | 429/53 |
| 2010/0021811 A1* | 1/2010 | Kado et al. | 429/185 |
| 2010/0081042 A1* | 4/2010 | Morishima et al. | 429/94 |
| 2010/0151301 A1* | 6/2010 | Paik et al. | 429/94 |
| 2010/0151302 A1* | 6/2010 | Maruyama et al. | 429/94 |
| 2010/0279170 A1* | 11/2010 | Lee et al. | 429/178 |

FOREIGN PATENT DOCUMENTS

| | | |
|---|---|---|
| JP | 10-284036 | 10/1998 |
| JP | 10-284036 A * | 10/1998 |
| JP | 2000-268877 | 9/2000 |

(Continued)

OTHER PUBLICATIONS

International Search Report in International Application No. PCT/JP2010/051716; Mailing Date: Apr. 27, 2010.

*Primary Examiner* — Ula C Ruddock
*Assistant Examiner* — Osei Amponsah
(74) *Attorney, Agent, or Firm* — Finnegan, Henderson, Farabow, Garrett & Dunner LLP

(57) ABSTRACT

A non-aqueous electrolyte secondary battery (100) includes: an electrode body (150) including a positive electrode plate (155), a negative electrode plate (156), and a separator (157); and a non-aqueous electrolyte contained inside the electrode body (150). The non-aqueous electrolyte secondary battery (100) further includes a reservoir member (170) defining a reservoir space (S1, S2) located adjacent to an end face (150*j*, 150*k*) of the electrode body (150), the reservoir space being used to hold the non-aqueous electrolyte forced out of the electrode body (150) through the end face (150*j*, 150*k*) of the electrode body (150).

2 Claims, 13 Drawing Sheets

(56) References Cited

FOREIGN PATENT DOCUMENTS

| JP | 2006-278245 | | 10/2006 | | |
| JP | 2009-26704 | | 2/2009 | | |
| JP | 2009-205864 | * | 9/2009 | ............ | H01M 2/26 |
| JP | 2009-289609 | | 12/2009 | | |
| JP | 2009-289609 A | * | 12/2009 | | |
| JP | 2009-289703 | | 12/2009 | | |
| WO | WO 2007-107137 | | 9/2007 | | |

* cited by examiner

NON-AQUEOUS ELECTROLYTE SECONDARY BATTERY

CROSS-REFERENCE TO RELATED APPLICATIONS

This is a national phase application based on the PCT International Patent Application No. PCT/JP2010/051716 filed on Feb. 5, 2010, the entire contents of which are incorporated herein by reference.

TECHNICAL FIELD

The present invention relates to a non-aqueous electrolyte secondary battery.

BACKGROUND ART

Much attention is now being paid to non-aqueous electrolyte secondary batteries such as lithium ion secondary batteries serving as an electric power supply for use in portable equipment or serving as a vehicle drive electric power supply for use in vehicles (electric vehicles, hybrid electric vehicles etc.). For instance, as a non-aqueous electrolyte secondary battery, there has been proposed a lithium ion secondary battery composed of an electrode body formed by winding a positive electrode plate, a negative electrode plate, and a separator, and a non-aqueous electrolyte contained in the electrode body (for example, see Patent Document 1).

RELATED ART DOCUMENTS

Patent Documents

Patent Document 1: JP 2000-268877A

Patent Document 1 discloses a lithium ion secondary battery including an electrolyte retention part in other than a section where the positive and negative electrodes of a battery element (a battery body) are arranged face to face with each other. More specifically, only a separator is wound as a winding start or end portion of the electrode body, so that the electrolyte retention part is made of only the separator. Alternatively, as the electrolyte retention part, there is described one that is a disc-shaped porous body formed of porous polypropylene which is arranged on top and bottom end faces of the wound electrode body. This literature discloses that such an electrolyte retention part can enhance the cycle life characteristic feature of the battery.

DISCLOSURE OF THE INVENTION

Problems to be Solved by the Invention

Incidentally, in the case where cycles of the high-rate current (high-rate) pulse charging/discharging are performed on a non-aqueous electrolyte secondary battery, such as a lithium ion secondary battery, the electrode body of the secondary battery repeatedly undergoes expansion and contraction. This expansion and contraction of the electrode body causes a non-aqueous electrolyte in the electrode body to be forced out of the electrode body through clearance gaps in the end faces of the electrode body (i.e., the top and bottom end faces of the electrode body in Patent Document 1), that is, through clearance gaps in the electrode plates and the separator which are situated adjacent to each other in the radial direction of the electrode body. The non-aqueous electrolyte thus forced out is spread all over the entire inner bottom surface of a battery casing, thereby impeding the forced out non-aqueous electrolyte from returning back into the electrode body. Therefore, the amount of non-aqueous electrolyte in the electrode body (particularly, the amount of electrolyte such as lithium salt) diminishes and, as a result, there is the possibility that the battery increases in internal resistance (for example, DC-IR), thereby resulting in deterioration in battery characteristic feature (output characteristic feature).

The present invention has been made in view of the circumstances to solve the above problems and has a purpose to provide a non-aqueous electrolyte secondary battery capable of restraining the increase in battery internal resistance, even when cycles of the high-rate current (high-rate) pulse charging/discharging are performed.

Means of Solving the Problems

It is preferable that a non-aqueous electrolyte secondary battery comprises an electrode body including a positive electrode plate, a negative electrode plate, and a separator; and a non-aqueous electrolyte contained in the electrode body, wherein the non-aqueous electrolyte secondary battery further comprises a reservoir member which defines a reservoir space situated adjacent to an end face of the electrode body to hold therein the non-aqueous electrolyte forced out from inside to outside of the electrode body through a clearance gap in the end face of the electrode body.

The aforesaid non-aqueous electrolyte secondary battery is provided with the reservoir member which defines the reservoir spaces situated respectively adjacent to the end faces of the electrode body so as to hold therein the non-aqueous electrolyte forced out from inside to outside of the electrode body through the clearance gaps in the end faces of the electrode body. Because of this arrangement, even in the case where cycles of the high-rate current (high-rate) pulse charging/discharging are performed on the non-aqueous electrolyte secondary battery to cause the non-aqueous electrolyte to be forced out, due to expansion and contraction of the electrode body, to outside of the electrode body through the clearance gaps in the end faces of the electrode body, the forced out non-aqueous electrolyte can be held in the reservoir spaces situated respectively adjacent to the end faces of the electrode body. This makes it possible to place the forced out non-aqueous electrolyte in a state of contact with the end faces of the electrode body, whereby the forced out non-aqueous electrolyte is allowed to return back into the electrode body through the clearance gaps in the end faces of the electrode body (as compared to the case where the forced out non-aqueous electrolyte is spread all over the entire inner bottom surface of the battery casing, the returning of the forced out non-aqueous electrolyte back into the electrode body becomes facilitated). Therefore, even when cycles of the high-rate current (high-rate) pulse charging/discharging are carried out, it is still possible to restrain the decrease in amount of non-aqueous electrolyte (in particular, electrolyte such as lithium salt) in the electrode body, thereby making it possible to restrain the battery from increasing in internal resistance (for example, DC-IR).

In addition, the end faces of the electrode body are at least the end faces of any one of the positive electrode plate, the negative electrode plate, and the separator, and are those formed by such end faces and exposed to the outside. For the case of an electrode body formed by winding a positive electrode plate, a negative electrode plate, and a separator, what serve as the end faces of the electrode body are, for example, surfaces (end faces shaped like a circle or a long circle) which are electrode body end faces oriented in the direction in which the winding axis (the central axis) extends, and which are end faces of the wound positive electrode plate or the like.

Further, "the clearance gaps in the end faces of the electrode body" represent clearance gaps between the positive electrode plate, the negative electrode plate and the separator constituting the end faces of the electrode body, and also indicate gaps between the positive electrode plate and others arranged adjacent to each other in the radial direction (for the case of a winding-type electrode body) or in the laminate direction (for the case of a lamination-type electrode body).

In addition, the reservoir member may be formed by a separate member from the battery casing or the battery casing (or a portion thereof) may be used as the reservoir member.

One aspect of the invention provides the above non-aqueous electrolyte secondary battery in which the electrode body is an electrode body formed by winding the positive electrode plate, the negative electrode plate, and the separator into a flattened form, and has an upper arc-shaped part constituting an upper end of the electrode body, a lower arc-shaped part constituting a lower end of the electrode body, and a flattened part situated between the upper arc-shaped part and the lower arc-shaped part, the reservoir member is a container for housing the electrode body, and has an arc-shaped inner bottom surface extending along an arc-shaped outer surface of the lower arc-shaped part in an axial direction of the electrode body, a first and a second inside surface extending along an outer surface of the flattened part in the axial direction of the electrode body and a third and a fourth inside surface spacedly facing the end faces of the electrode body respectively, the end faces of the electrode body include a first end face facing the third inside surface and a second end face facing the fourth inside surface, and the reservoir spaces include: a first reservoir space enclosed and defined by the inner bottom surface, the first inside surface, the second inside surface, the third inside surface, and the first end face of the electrode body; and a second reservoir space enclosed and defined by the inner bottom surface, the first inside surface, the second inside surface, the fourth inside surface, and the second end face of the electrode body.

The above non-aqueous electrolyte secondary battery includes the electrode body which is formed by winding the positive electrode plate, the negative electrode plate, and the separator into a flattened form, and which has the upper arc-shaped part constituting the upper end of the electrode body, the lower arc-shaped part constituting the lower end of the electrode body and the flattened part situated between the upper arc-shaped part and the lower arc-shaped part. The secondary battery further includes the reservoir member which is a container for housing the electrode body, and which has the arc-shaped inner bottom surface extending along the arc-shaped outer surface of the lower arc-shaped part in the axial direction of the electrode body, the first and the second inside surfaces extending along the outer surface of the flattened part in the axial direction of the electrode body and the third and the fourth inside surfaces spacedly facing the end faces of the electrode body respectively. In addition, the end faces of the electrode body are two end faces oriented in the direction of the axis (axial direction) of the electrode body, namely, the long circle-shaped, first end face facing the third inside surface of the reservoir member and the long circle-shaped, second end face facing the fourth inside surface of the reservoir member.

The aforesaid non-aqueous electrolyte secondary battery is provided, as the reservoir spaces, with the first and the second reservoir spaces wherein the first reservoir space is enclosed and defined by the inner bottom surface, the first inside surface, the second inside surface and the third inside surface of the reservoir member and the first end face of the electrode body whereas the second reservoir space is enclosed and defined by the inner bottom surface, the first inside surface, the second inside surface and the fourth inside surface of the reservoir member and the second end face of the electrode body. This makes it possible that the non-aqueous electrolyte, forced out from inside to outside of the electrode body through the clearance gaps in the first end face of the electrode body, is held in place in the first reservoir space situated adjacent to the first end face of the electrode body (situated, relative to the axial direction of the electrode body, adjacent to the first end face). This further makes it possible that the non-aqueous electrolyte, forced out from inside to outside of the electrode body through the clearance gaps in the second end face of the electrode body, is held in place in the second reservoir space situated adjacent to the second end face of the electrode body (situated, relative to the axial direction of the electrode body, adjacent to the second end face). This makes it possible to place the forced out non-aqueous electrolyte in a state of contact with the first and the second end faces of the electrode body, so that thereafter the forced out non-aqueous electrolyte is allowed to return back into the electrode body through the clearance gaps of the first and the second end faces of the electrode body.

In addition, the upper arc-shaped part of the electrode body is a part (a vertical upper end constituting part) that is situated on the side of the vertical upper end of the electrode body at the time of operation of the non-aqueous electrolyte secondary battery, and is a part where the electrode plates and so on are layered one upon the other in the form of an arc. On the other hand, the lower arc-shaped part of the electrode body is a part (a vertical lower end constituting part) that is situated on the side of the vertical lower end of the electrode body at the time of operation of the non-aqueous electrolyte secondary battery, and is a part where the electrode plates and so on are layered one upon the other in the form of an arc. The flattened part is a part of the electrode body that is situated between the upper arc-shaped part and the lower arc-shaped part, and is a part where the electrode plates and so on are layered one upon the other in the form of a flat surface in the direction of the thickness of the electrode body.

In any one of the aforesaid non-aqueous electrolyte secondary batteries, preferably, the secondary battery further includes a metallic battery casing, the reservoir member is a container for housing the electrode body and is formed of electric insulating resin, the reservoir member housing the electrode body is arranged in the battery casing.

According to the aforesaid non-aqueous electrolyte secondary battery, the electrode body is housed in the reservoir member formed of electric insulating resin and the reservoir member with the electrode body housed therein is arranged in the metallic battery casing. Therefore, the reservoir member formed of electric insulating resin provides electric insulation between the electrode body and the battery casing.

MODE FOR CARRYING OUT THE INVENTION

Embodiments

Figure 1:
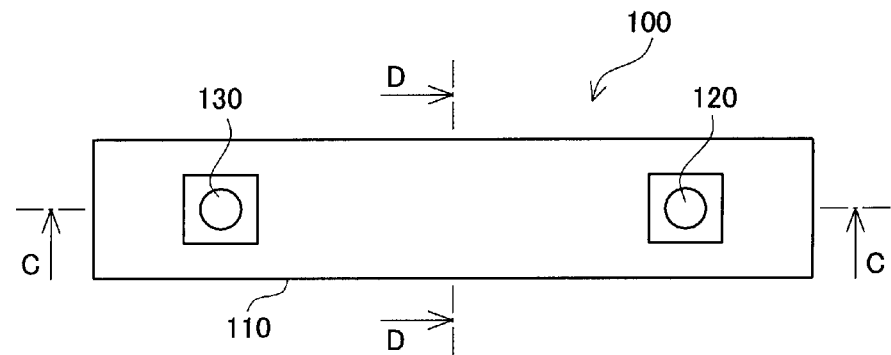
FIG. 1 is a top view of a non-aqueous electrolyte secondary battery in an embodiment.
Figure 2:
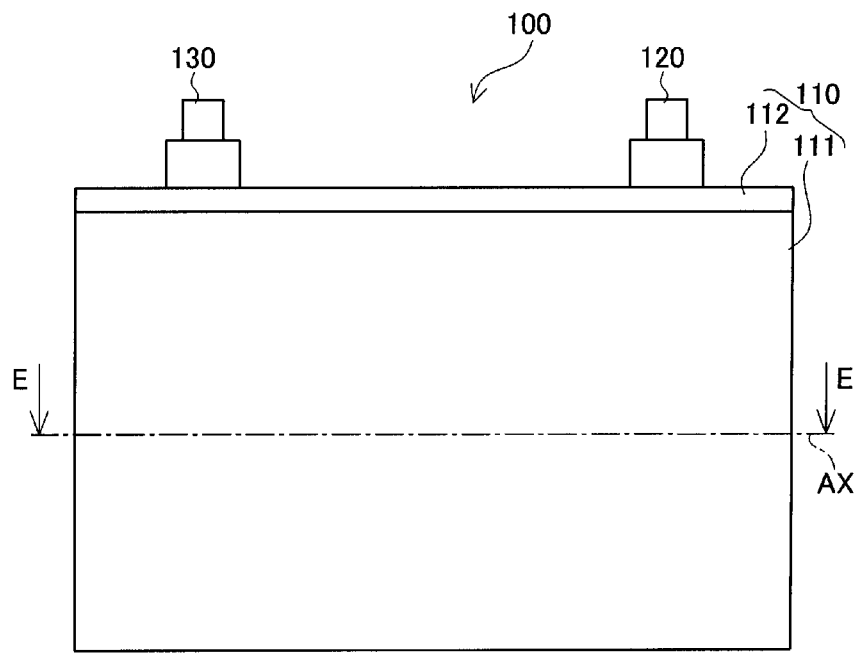
FIG. 2 is a front view of the non-aqueous electrolyte secondary battery.

Referring now to the drawing figures, there is given a description regarding an embodiment of the present invention.

A non-aqueous electrolyte secondary battery 100 of the present embodiment is, as shown in FIGS. 1-5, a rectangular sealed type lithium ion secondary battery including a battery casing 110 having a rectangular parallelepiped shape, a positive external terminal 120, and a negative external terminal 130. The battery casing 110 is a hard casing having a metallic rectangular housing part 111 defining a housing space of a rectangular parallelepiped shape and a metallic lid part 112. Arranged in the battery casing 110 (the rectangular housing part 111) are an electrode body 150 and other components. Note that the rating capacity (nominal capacity) of the secondary battery 100 is 5.5 Ah.

The electrode body 150 is shaped like a long circle in cross section and is a flattened, wound body formed by winding a positive electrode plate 155, a negative electrode plate 156, and a separator 157 (which are all in the form of a sheet) into a flattened form (see FIGS. 4, 6-9 and 11). The positive electrode plate 155 has a positive current collector 151 formed of an aluminum foil and a positive material mixture 152 (a mixture containing a positive active material 153) coated on the surfaces of the positive current collector 151 (see FIG. 7). The negative electrode plate 156 has a negative current collector 158 formed of a copper foil and a negative material mixture 159 (a mixture containing a negative active material 154) coated on the surfaces of the negative current collector 158 (see FIG. 8). The electrode body 150 contains therein a non-aqueous electrolyte.

Figure 3:
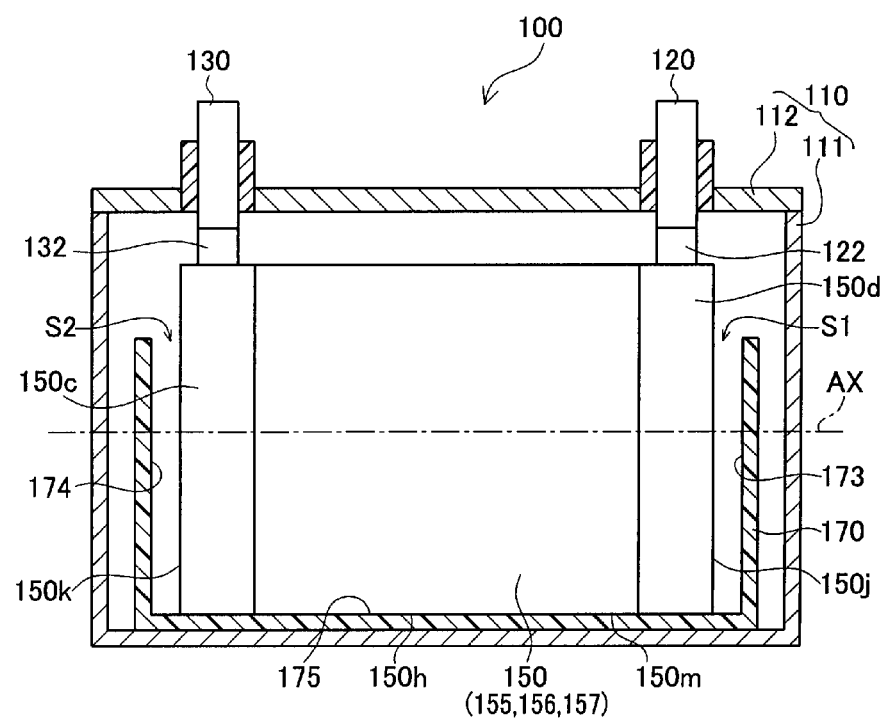
FIG. 3 is a vertical cross sectional view of the non-aqueous electrolyte secondary battery, taken along a line C-C in FIG. 1.
Figure 4:
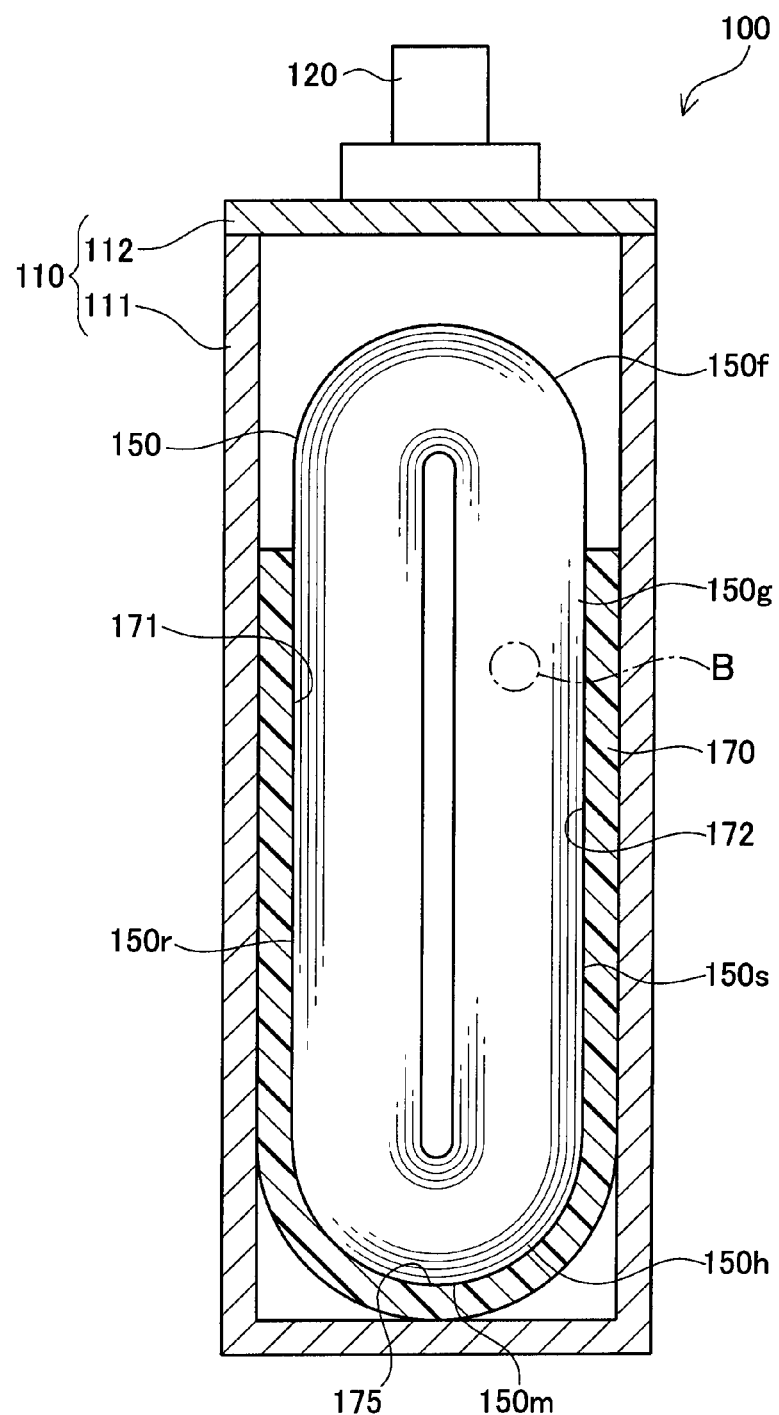
FIG. 4 is a cross sectional view of the non-aqueous electrolyte secondary battery, taken along a line D-D in FIG. 1.
Figure 11:
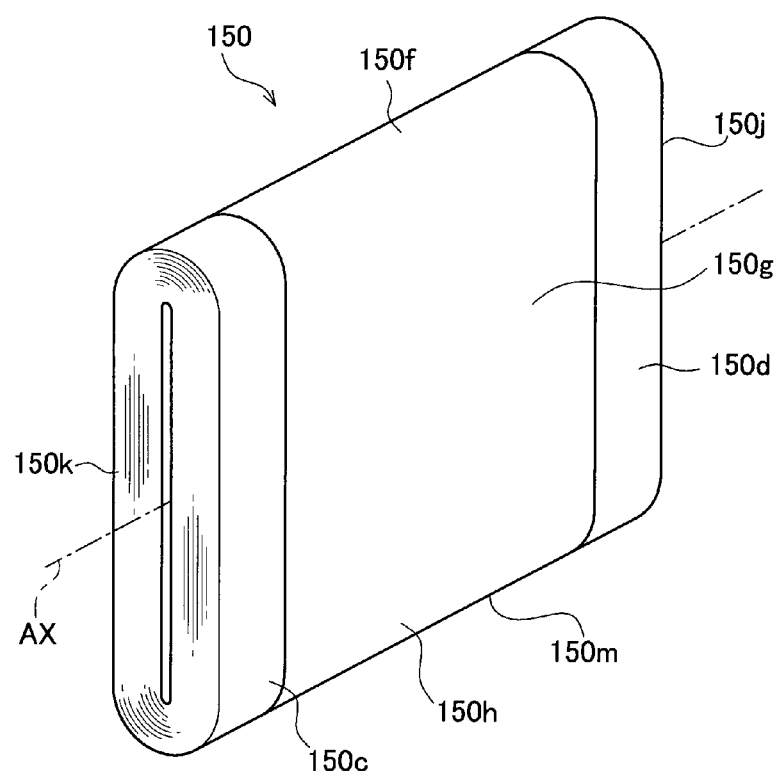
FIG. 11 is a perspective view of the electrode body.

The electrode body 150 has an upper arc-shaped part 150$f$ constituting an upper end of the electrode body 150, a lower arc-shaped part 150$h$ constituting a lower end of the electrode body 150 and a flattened part 150$g$ situated between the upper arc-shaped part 150$f$ and the lower arc-shaped part 150$h$ (see FIGS. 4 and 11). The upper arc-shaped part 150$f$ is a part which is located at an upper end of the electrode body 150 in a vertical direction (the upper side in FIGS. 3 and 4) at the time of operation of the non-aqueous electrolyte secondary battery 100 (i.e., a part constituting the upper end part in the vertical direction). Further, the upper arc-shaped part 150$f$ is a part where the electrode plates and others (the positive electrode plate 155 and so on) are superimposed one upon the other in the form of an arc.

On the other hand, the lower arc-shaped part 150$h$ is a part which is located at a lower end of the electrode body 150 in the vertical direction (the lower side in FIGS. 3 and 4) at the time of operation of the non-aqueous electrolyte secondary battery 100 (i.e., a part constituting the lower end part in the vertical direction). Further, the lower arc-shaped part 150$h$ is a part where the electrode plates and others (the positive electrode plate 155 and so on) are superimposed one upon the other in the form of an arc. In addition, the flattened part 150$g$ is a part of the electrode body 150 situated between the upper arc-shaped part 150$f$ and the lower arc-shaped part 150$h$, and is a part where the electrode plates and others (the positive electrode plate 155 and so on) are superimposed one upon the other in the direction of the thickness of the electrode body 150 (the horizontal direction in FIG. 4) in the form of a flat surface.

In addition, referring to FIGS. 3 and 11, the electrode body 150 has a first end face 150$j$ and a second end face 150$k$ each of which is oriented in the axial direction of the electrode body 150 (in the extending direction of the axis AX, i.e., the right and left directions in FIG. 3). The first end face 150$j$ is a long-circular end face defined by an end face of the wound, positive electrode plate 155 (to be exact, a positive active material uncoated part 155$b$). The first end face 150$j$ has a clearance gap between adjacent portions of the positive electrode plate 155 (to be exact, the positive active material uncoated part 155$b$) in the radial direction of the electrode body 150 (in the direction orthogonal to the winding direction). Note here that "the positive active material uncoated part 155$b$" represents a part of the positive electrode plate 155 where the positive material mixture 152 is not coated on the surfaces of the positive current collector 151 (see FIG. 7).

The second end face 150$k$ is a long-circular end face defined by an end face of the wound, negative electrode plate 156 (to be exact, a negative active material uncoated part 156$b$) (see FIGS. 3 and 11). The second end face 150$k$ has clearance gap between adjacent portions of the negative electrode plate 156 (to be exact, the negative active material uncoated part 156$b$) in the radial direction of the electrode body 150 (in the direction orthogonal to the winding direction). Note here that "the negative active material uncoated part 156$b$" represents a part of the negative electrode plate 156 where the negative material mixture 159 is not coated on the surfaces of the negative current collector 158 (see FIG. 8).

Figure 16:
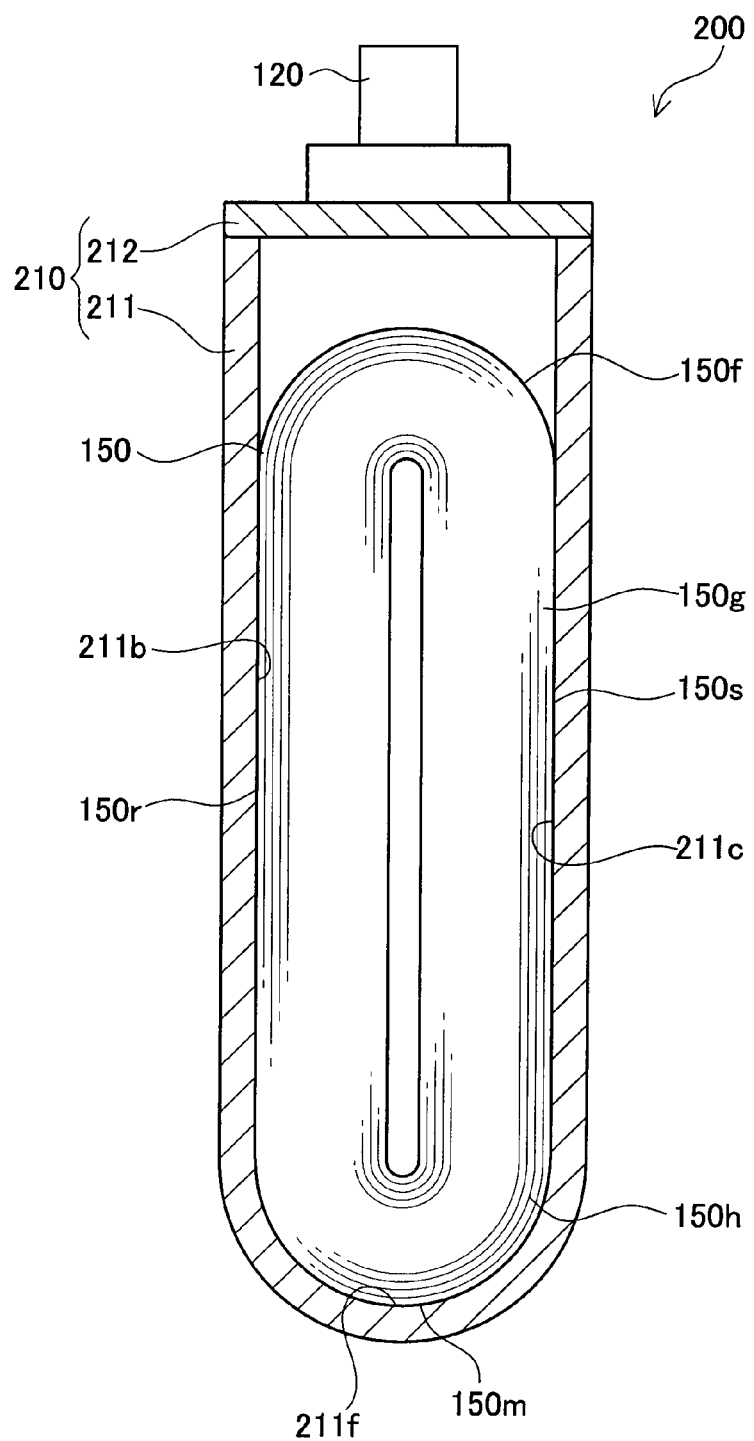
FIG. 16 is a vertical cross sectional view of the non-aqueous electrolyte secondary battery, taken along a line G-G in FIG. 13, in the modified example.

The positive external terminal 120 is electrically connected through a positive current collecting part 122 to a positive wound part 150$d$ located at one end of the electrode body 150 (the right-hand side end in FIG. 3). In addition, the positive wound part 150$d$ is a part formed by winding of the positive active material uncoated part 155*b*. In addition, diagrammatic representation of the positive current collecting part 122 is omitted in FIGS. 4 and 16.

On the other hand, the negative external terminal 130 is electrically connected through a negative current collecting part 132 to a negative wound part 150*c* located at the other end of the electrode body 150 (the left-hand side end in FIG. 3). In addition, the negative wound part 150*b* is a part formed by winding of the negative active material uncoated part 156*b*.

In the present embodiment, lithium nickel oxide is used as the positive active material 153 and graphite is used as the negative active material 154. A porous sheet made of polypropylene is used as the separator 157. In addition, as the non-aqueous electrolyte, there is used a non-aqueous electrolyte prepared by dissolving lithium hexafluorophosphate which is a lithium salt, into a non-aqueous solvent which is a mixture of EC (ethylene carbonate), DMC (dimethyl carbonate) and EMC (ethyl methyl carbonate). Note that in the present embodiment, the concentration of lithium salt in the non-aqueous electrolyte is 1.0 mol/L.

Further, the non-aqueous electrolyte secondary battery 100 of the present embodiment has a reservoir member 170 (see FIGS. 3-5 and 10). The reservoir member 170 is a container (hard casing) formed of electric insulating resin (polypropylene is used in the present embodiment), and houses the electrode body 150. In this way, in the secondary battery 100 of the present embodiment, the electrode body 150 is housed in the reservoir member 170 formed of electric insulating resin, and the reservoir member 170 with the electrode body 150 housed therein is arranged in the metallic battery casing 110. This makes it possible for the reservoir member 170 formed of electric insulating resin to provide electric insulation between the electric body 150 and the battery casing 110.

The reservoir member 170 has an inner bottom surface 175, a first inside surface 171, a second inside surface 172, a third inside surface 173, and a fourth inside surface 174. The inner bottom surface 175 of the reservoir member 170 is of an arc-shaped cross section and is in a such a form that it extends along an arc-shaped outer surface 150*m* of the lower arc-shaped part 150*h* of the electrode body 150 in the axial direction of the electrode body 150 (in the direction in which the axis AX extends, i.e., in the direction orthogonal to the surface of FIG. 4) (see FIGS. 3, 4 and 10). The inner bottom surface 175 is in contact with the lower arc-shaped part 150*h* of the electrode body 150 (see FIG. 4).

The first and the second inside surfaces 171 and 172 of the reservoir member 170 are flat surfaces facing each other. The first inside surface 171 has a form extending along a first outer surface 150*r* of the flattened part 150*g* of the electrode body 150 in the axial direction of the electrode body 150 (see FIGS. 4, 5 and 10). The first inside surface 171 is in contact with the first outer surface 150*r* of the flattened part 150*g*. In addition, the second inside surface 172 has a form extending along a second outer surface 150*s* of the flattened part 150*g* of the electrode body 150 in the axial direction of the electrode body 150 (see FIGS. 4, 5 and 10). The second inside surface 172 is in contact with the second outer surface 150*s* of the flattened part 150*g* (see FIG. 4).

The third and the fourth inside surfaces 173 and 174 of the reservoir member 170 are flat surfaces facing each other. The third inside surface 173 is face-to-face with the first end face 150*j* of the electrode body 150 and spaced with a clearance gap from the first end face 150*j*. The fourth inside surface 174 is face-to-face with the second end face 150*k* of the electrode body 150 and spaced with a clearance gap from the second end face 150*k*.

Figure 5:
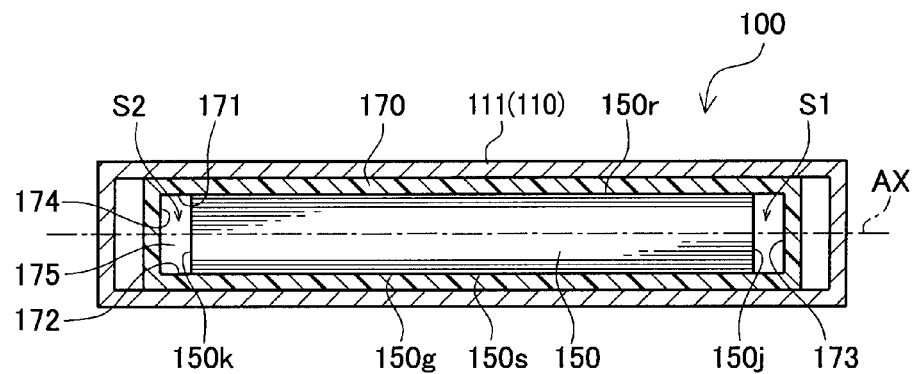
FIG. 5 is a horizontal cross sectional view of the non-aqueous electrolyte secondary battery, taken along a line E-E in FIG. 2.
Figure 6:
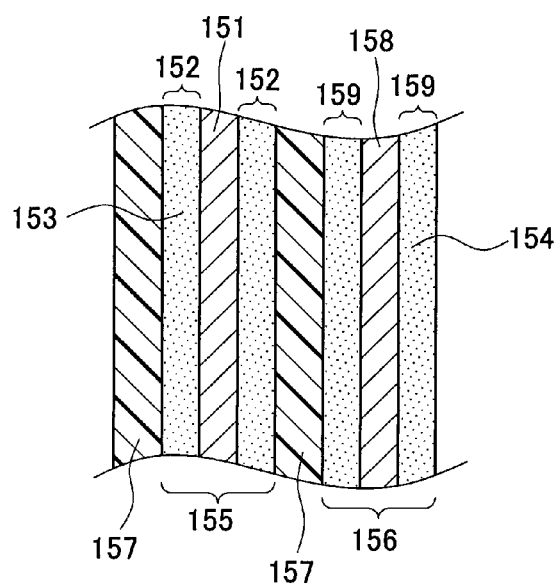
FIG. 6 is a partial enlarged cross sectional view of an electrode body, corresponding to a part B in FIG. 4.

In the present embodiment, as described above, the reservoir member 170 with the electrode body 150 housed therein defines a first reservoir space S1 situated adjacent to the first end face 150*j* of the electrode body 150 (situated on the right-hand side of the first end face 150*j* in FIG. 5) (see FIGS. 3 and 5). More specifically, the first reservoir space S1 is enclosed and defined by the inner bottom surface 175, the first inside surface 171, the second inside surface 172 and the third inside surface 173 of the reservoir member 170 and the first end face 150*j* of the electrode body 150.

As described above, the reservoir member 170 with the electrode body 150 housed therein further defines a second reservoir space S2 situated adjacent to the second end face 150*k* of the electrode body 150 (situated on the left-hand side of the second end face 150*k* in FIG. 5) (see FIGS. 3 and 5). More specifically, the second reservoir space S2 is enclosed and defined by the inner bottom surface 175, the first inside surface 171, the second inside surface 172 and the fourth inside surface 174 of the reservoir member 170 and the second end face 150*k* of the electrode body 150.

Meanwhile, in the case where cycles of the high-rate current (high-rate) pulse charging/discharging are performed on a non-aqueous electrolyte secondary battery (for example, a lithium ion secondary battery), the electrode body of the secondary battery repeatedly undergoes expansion and contraction. This expansion and contraction of the electrode body causes a non-aqueous electrolyte in the electrode body to be forced out of the electrode body through the clearance gaps in the end faces of the electrode body. Therefore, in the conventional non-aqueous electrolyte secondary battery, the forced out non-aqueous electrolyte is spread all over the entire inner bottom surface of the battery casing, thereby impeding the returning of the forced out non-aqueous electrolyte back into the electrode body. Therefore, for the case of the conventional non-aqueous electrolyte secondary battery, the amount of non-aqueous electrolyte in the electrode body (particularly, the amount of electrolyte such as lithium salt) diminishes and, as a result, there is the possibility that the battery increases in internal resistance (for example, DC-IR), resulting in deterioration in battery characteristic feature (output characteristic feature).

On the other hand, the non-aqueous electrolyte secondary battery 100 of the present embodiment has, as described above, the first reservoir space S1 defined by the reservoir member 170 housing the electrode body 150 and situated adjacent to the first end face 150*j* of the electrode body 150 (see FIGS. 3 and 5). More specifically, the first reservoir space S1 is enclosed and defined by the inner bottom surface 175, the first inside surface 171, the second inside surface 172 and the third inside surface 173 of the reservoir member 170 and the first end face 150*j* of the electrode body 150.

Figure 12:
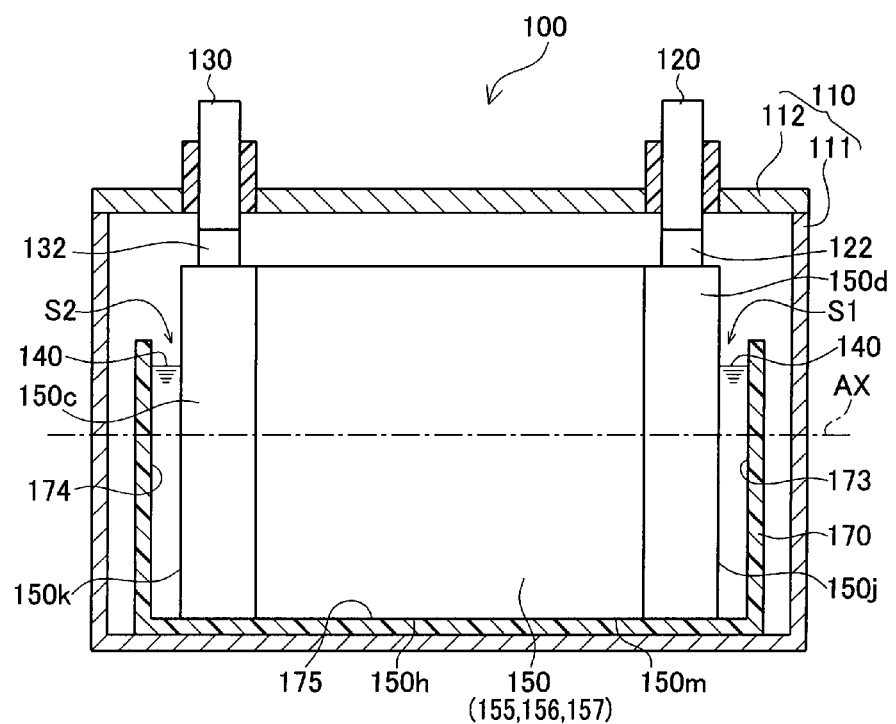
FIG. 12 is a view of the non-aqueous electrolyte secondary battery in a state where non-aqueous electrolyte is held in a first reservoir space and a second reservoir space.
Figure 13:
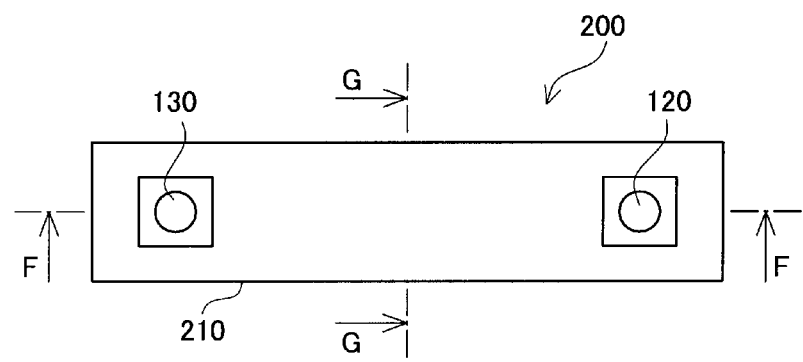
FIG. 13 is a top view of a non-aqueous electrolyte secondary battery in a modified example.
Figure 14:
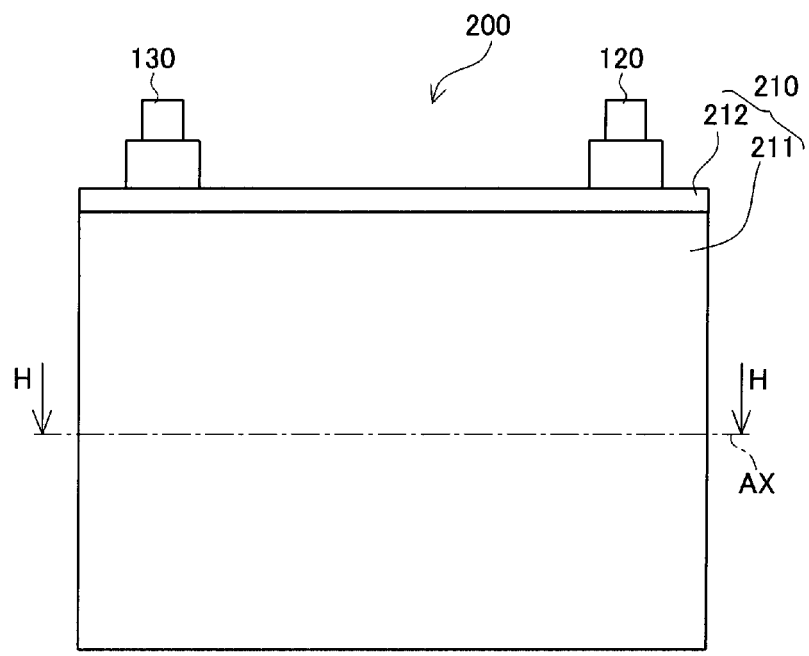
FIG. 14 is a front view of the non-aqueous electrolyte secondary battery in the modified example.

Because of such arrangement, even in the case where the high-rate current (high-rate) pulse charging/discharging cycles conducted on the non-aqueous electrolyte secondary battery 100 of the present embodiment causes the non-aqueous electrolyte in the electrode body 150 to be forced out of the electrode body 150 through the clearance gaps in the first end face 150*j* of the electrode body 150, the non-aqueous electrolyte 140 thus forced out can be held in place in the first reservoir space S1 situated adjacent to the first end face 150*j* of the electrode body 150 (situated adjacent, relative to the axial direction of the electrode body 150, to the first end face 150*j*, i.e., situated on the right-hand side of the first end face 150*j* in FIG. 12).

Because of this, as shown in FIG. 12, it becomes possible to place the forced out non-aqueous electrolyte 140 in a state of contact with the first end face 150*j* of the electrode body 150, thereby making it possible to thereafter bring back the forced out non-aqueous electrolyte 140 into the electrode body 150 through the clearance gaps in the first end face 150j of the electrode body 150. As described above, according to the non-aqueous electrolyte secondary battery 100 of the present embodiment, the returning of the forced out non-aqueous electrolyte back into the electrode body is facilitated, as compared to the case of the conventional non-aqueous electrolyte secondary battery where the forced out non-aqueous electrolyte is spread all over the entire inner bottom surface of the battery casing.

The non-aqueous electrolyte secondary battery 100 of the present embodiment further has the second reservoir space S2 defined by the reservoir member 170 housing the electrode body 150 and situated adjacent to the second end face 150k of the electrode body 150 (see FIGS. 3 and 5). More specifically, the second reservoir space S2 is enclosed and defined by the inner bottom surface 175, the first inside surface 171, the second inside surface 172 and the fourth inside surface 174 of the reservoir member 170 and the second end face 150k of the electrode body 150.

Because of such arrangement, even in the case where the high-rate current (high-rate) pulse charging/discharging cycles conducted on the non-aqueous electrolyte secondary battery 100 of the present embodiment causes the non-aqueous electrolyte in the electrode body 150 to be forced out of the electrode body 150 through the clearance gaps in the second end face 150k of the electrode body 150, the forced out non-aqueous electrolyte can be held in place in the second reservoir space S2 situated adjacent to the second end face 150k of the electrode body 150 (situated adjacent, relative to the axial direction of the electrode body 150, to the second end face 150k, i.e., situated adjacent on the left-hand side of second end face 150k) (see FIG. 12).

Because of this, as shown in FIG. 12, it becomes possible to place the forced out non-aqueous electrolyte 140 in a state of contact with the second end face 150k of the electrode body 150, thereby making it possible to thereafter bring back the forced out non-aqueous electrolyte 140 into the electrode body 150 through the clearance gaps in the second end face 150k of the electrode body 150. As described above, according to the non-aqueous electrolyte secondary battery 100 of the present embodiment, the returning of the forced out non-aqueous electrolyte back into the electrode body is facilitated, as compared to the case of the conventional non-aqueous electrolyte secondary battery where the forced out non-aqueous electrolyte is spread all over the entire inner bottom surface of the battery casing.

Accordingly, even when cycles of the high-rate current (high-rate) pulse charging/discharging cycle are conducted on the non-aqueous electrolyte secondary battery 100 of the present embodiment, it is possible to restrain the decrease in amount of non-aqueous electrolyte (Li salt) in the electrode body 150, thereby making it possible to restrain the battery from increasing in its internal resistance (for example, DC-IR).

(High-Rate Cycle Charging/Discharging Testing)

Firstly, before conducting high-rate cycle charging/discharging testing, the battery capacitance of the non-aqueous electrolyte secondary battery 100 (hereinafter referred to as the pre-cycle capacity) was measured under a thermal environment of 25° C. In particular, charging was carried out at a constant electric current of 1 C (5.5 A) until the battery voltage of the secondary battery 100 had reached 4.2 V. Subsequently, with the battery voltage of the secondary battery 100 maintained at 4.2 V, charging was carried out until the electric current value had become 0.1 C (0.55 A). This brought the SOC of the secondary battery 100 at 100%.

Incidentally, 1 C is an electric current value at which value the discharging of a battery having a rating capacity value (a nominal capacity value) is ended in one hour when subjected to the constant electric current discharging. Since the rating capacity (the nominal capacity) of the non-aqueous electrolyte secondary battery 100 of the present embodiment is 5.5 Ah, then 1 C=5.5 A.

In addition, SOC stands for State Of Charge (charging state or charging rate).

Thereafter, discharging was carried out at a constant electric current of 1 C (5.5 A) until the battery voltage of the non-aqueous electrolyte secondary battery 100 had reached 2.5 V. This brought the SOC of the secondary battery 100 at 0%. The amount of electricity discharged was measured as a pre-cycle capacity for the secondary battery 100 and the result was 5.53 Ah.

In addition, there was prepared, as a comparative example, a non-aqueous electrolyte secondary battery different from the non-aqueous electrolyte secondary battery 100 of the present embodiment in that there was no provision of the reservoir member 170. Also with respect to this comparative secondary battery, its pre-cycle capacity was measured in the same way that the pre-cycle capacity of the secondary battery 100 of the present embodiment was measured and the result was 5.52 Ah.

In addition, before conducting the cycle charging/discharging testing, the DC-IR of the non-aqueous electrolyte secondary battery 100 (hereinafter referred to as the pre-cycle DC-IR) was measured under a thermal environment of 25° C. In particular, there was first prepared a non-aqueous electrolyte secondary battery 100 whose SOC was regulated at 50%. Then, with respect to the secondary battery 100 thus prepared, pulse discharging was carried out for a period of 10 seconds at a constant electric current of 1 C (5.5 A). Thereafter, with respect to the secondary battery 100, the battery voltage was measured. Next, with respect to the secondary battery 100, pulse charging was carried out for a period of 10 seconds at a constant electric current of 1 C (5.5 A).

Thereafter, the electric current value was sequentially changed to 3 C (16.5 A), then to 5 C (27.5 A) and then to 10 C (55 A) and with respect to the non-aqueous electrolyte secondary battery 100, pulse discharging was carried out for a period of 10 seconds, then the battery voltage was measured and pulse charging was carried out for a period of 10 seconds, as described above (the electric current value of 1 C).

Thereafter, battery voltage values after pulse discharging was carried out for a period of 10 seconds at electric current values of 1 C, 3 C, 5 C, and 10C, respectively, were plotted in a graph in which the X-axis indicates the discharging electric current and the Y-axis indicates the battery voltage value after 10-second pulse discharging. And, based on the value (x, y) of each point plotted, there was calculated a direct function by the method of least squares and its slope value was used as a DC-IR value for the non-aqueous electrolyte secondary battery 100. The pre-cycle DC-IR value of the secondary battery 100 was 3.2 mΩ.

In addition, with respect to the comparative non-aqueous electrolyte secondary battery, the pre-cycle DC-IR thereof was measured in the same way as that of the non-aqueous electrolyte secondary battery 100 of the present embodiment was measured and the result was 3.1 mΩ. These results are shown in Table 1.

TABLE 1

|  | Pre-cycle Capacity | Pre-cycle DC-IR | Post-cycle DC-IR |
|---|---|---|---|
| Comparative Example | 5.52 Ah | 3.1 mΩ | 4.6 mΩ |
| Present Embodiment | 5.53 Ah | 3.2 mΩ | 3.3 mΩ |

Next, with respect to the non-aqueous electrolyte secondary battery 100 of the present embodiment, the high-rate current (high-rate) pulse charging/discharging cycle testing was conducted under a thermal environment of 25° C. More specifically, there was prepared a non-aqueous electrolyte secondary battery 100 whose SOC was regulated to 50%, and with respect to the secondary battery 100 thus prepared, pulse charging (constant electric current charging) was carried out for a period of 10 seconds at a high-rate constant electric current of 20 C (110 A). Subsequently, after a rest of 10 minutes, with respect to this secondary battery 100, pulse discharging (constant electric current discharging) was carried out for a period of 10 seconds at a high-rate constant electric current of 20 C (110 A). Thereafter, there was taken a rest of 10 minutes. Taking this charging/discharging cycle as one cycle, 2000 cycles of the high-rate charging and discharging were carried out.

In addition, also with respect to the comparative non-aqueous electrolyte secondary battery, 2000 cycles of the high-rate charging/discharging were carried out in the same way as the non-aqueous electrolyte secondary battery of the present embodiment.

With respect to the non-aqueous electrolyte secondary battery 100 of the present embodiment after having undergone the 2000 high-rate charging/discharging cycles, its DC-IR (referred to as the post-cycle DC-IR) was measured under a thermal environment of 25° C. in the way as described above and the result was 3.3 mΩ. Therefore, the secondary battery 100 according to the present embodiment increased only by 0.1 mΩ in DC-IR value even after having undergone the 2000 high-rate charging/discharging cycles. This result is shown in Table 1.

In this way, in the non-aqueous electrolyte secondary battery 100 of the present embodiment, the increase in battery internal resistance (DC-IR) was restrained even after the high-rate current (high-rate) pulse charging/discharging. This is because it is conceivable that, in the secondary battery 100 of the present embodiment, the first reservoir space S1 situated adjacent to the first end face 150j of the electrode body 150 and the second reservoir space S2 situated adjacent to the second end face 150k of the electrode body 150 are defined by the reservoir member 170 with the electrode body 150 housed therein (see FIGS. 3 and 5).

That is, due to the high-rate current (high-rate) pulse charging/discharging cycles conducted on the non-aqueous electrolyte secondary battery 100 of the present embodiment, the non-aqueous electrolyte is forced out from inside to outside of the electrode body 150 through the clearance gaps in the first and the second end faces 150j and 150k of the electrode body 150. In the non-aqueous electrolyte secondary battery 100 of the present embodiment, therefore, this forced out non-aqueous electrolyte 140 can be held in place in the first and the second reservoir spaces S1 and S2 (see FIG. 12). It is therefore possible to place the forced-out non-aqueous electrolyte 140 in a state of contact with the first and the second end faces 150j and 150k of the electrode body 150 whereby the forced-out non-aqueous electrolyte 140 can be brought back into the electrode body 150 through the clearance gaps in the first and the second end faces 150j and 150k of the electrode body 150. Accordingly, the increase in battery internal resistance (DC-IR) is restrained in the secondary battery 100 of the present embodiment, thereby possibly resulting in restraining the decrease in amount of non-aqueous electrolyte (Li salt) in the electrode body 150 even after having undergone the high-rate current (high-rate) pulse charging/discharging cycles.

On the other hand, with respect to the comparative non-aqueous electrolyte secondary battery after 2000 cycles of the high-rate charging/discharging were conducted thereon, its DC-IR (referred to as the post-cycle DC-IR) was measured under a thermal environment of 25° C. in the way as described above, and the result was 4.6 mΩ. Therefore, in the comparative secondary battery, the value of DC-IR was increased by as much as 1.5 mΩ due to the 2000 high-rate charging/discharging cycles.

The possible reason for such a considerable increase in internal resistance (DC-IR) is that unlike the non-aqueous electrolyte secondary battery 100 of the present embodiment, the comparative non-aqueous electrolyte secondary battery is not provided with the reservoir member 170 (stated in another way, neither the first reservoir space S1 nor the second reservoir space S2 is provided). That is to say, it can be thought that in the comparative secondary battery, the non-aqueous electrolyte, forced out from inside to outside of the electrode body through the clearance gaps in the first and the second end faces of the electrode body, is spread all over the entire inner bottom surface of the battery casing and much of it had not been returned back into the electrode body. Therefore, the amount of non-aqueous electrolyte (in particular, Li salt) in the electrode body diminishes, thereby possibly resulting in a considerable increase in battery internal resistance (DC-IR).

The foregoing result proves that the non-aqueous electrolyte secondary battery 100 of the present embodiment is a non-aqueous electrolyte secondary battery capable of restraining the increase in battery internal resistance even after having undergone the high-rate current (high-rate) pulse charging/discharging cycles.

Next, a description will be given regarding a method of manufacture of the non-aqueous electrolyte secondary battery 100.

Figure 7:
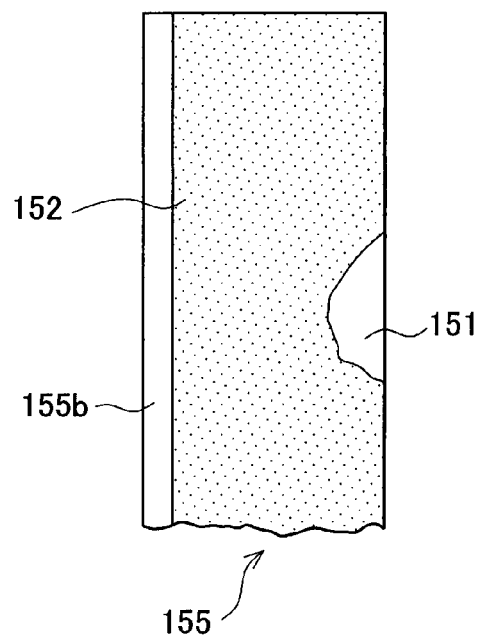
FIG. 7 is a view showing a positive electrode plate.
Figure 8:
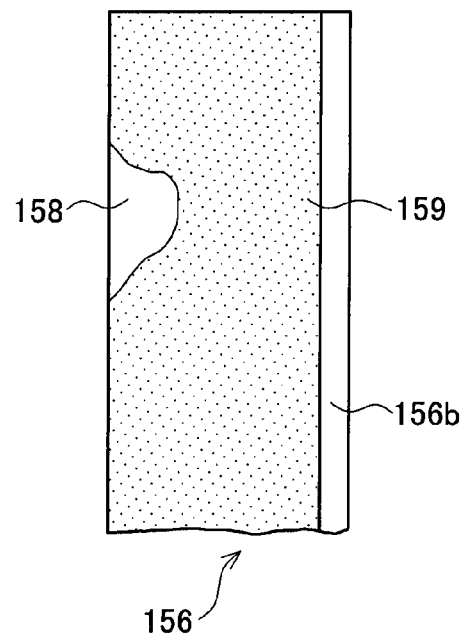
FIG. 8 is a view showing a negative electrode plate.

As shown in FIG. 7, there is first prepared a positive electrode plate 155 with a positive material mixture 152 coated on the surface of a strip-shaped positive current collector 151. As shown in FIG. 8, there is further prepared a negative electrode plate 156 with a negative material mixture 159 coated on the surface of a strip-shaped negative current collector 158.

Figure 9:
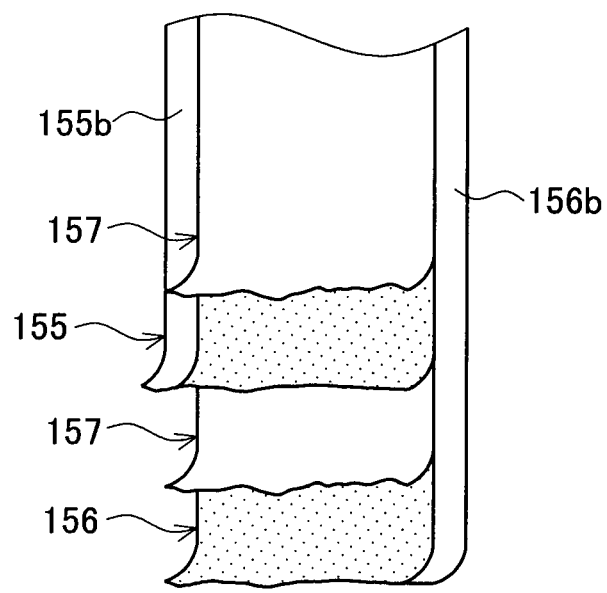
FIG. 9 is an explanatory view of a process of manufacturing the electrode body in which the negative plate, positive plate, and separator are wound together.
Figure 10:
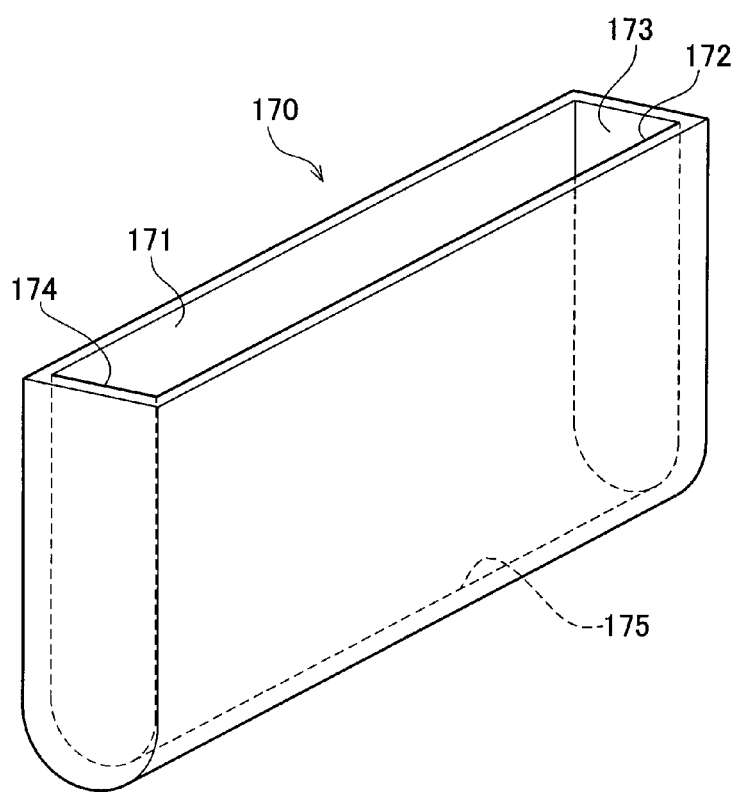
FIG. 10 is a perspective view of a reservoir member in the embodiment.

Next, as shown in FIG. 9, there is provided the positive electrode plate 155, the negative electrode plate 156, and the separator 157 are superimposed one upon another and are wound together into a flattened form, thereby producing an electrode body 150 (see FIG. 11). However, the electrode body 150 is formed such that, in the positive electrode plate 155 and the negative electrode plate 156, the positive active material uncoated part 155b and the negative active material uncoated part 156b are placed in a back-to-back manner in a width direction of the electrode plates 155 and 156 (in the horizontal direction in FIG. 9) and in addition and these parts 155b and 156b project out from the widthwise ends of the separator 157.

Subsequently, a reservoir member 170 integrally formed of polypropylene is prepared and the electrode body 150 is housed in the reservoir member 170. Accordingly, the first reservoir space S1 is defined adjacent to the first end face 150j of the electrode body 150 (see FIGS. 3 and 5). More specifically, the first reservoir space S1 is enclosed and defined by the inner bottom surface 175, the first inside surface 171, the second inside surface 172 and the third inside surface 173 of the reservoir member 170 and the first end face 150j of the electrode body 150. Further, the second reservoir space S2 is defined adjacent to the second end face 150k of the electrode body 150 (see FIGS. 3 and 5). More specifically, the second reservoir space S2 is enclosed and defined by the inner bottom surface 175, the first inside surface 171, the second inside surface 172 and the fourth inside surface 174 of the reservoir member 170 and the second end face 150k of the electrode body 150.

Subsequently, the positive current collector part 122 of the positive external terminal 120 is welded to an upper end of the positive wound part 150d of the electrode body 150. In addition, the negative current collector part 132 of the negative external terminal 130 is welded to an upper end of the negative wound part 150c of the electrode body 150. Thereafter, the electrode body 150 arranged in the reservoir member 170 is accommodated in the rectangular housing part 111 and the opening of the rectangular housing part 111 is closed with the lid part 112. Next, the lid part 112 and the rectangular housing part 111 are united together by welding. Next, a non-aqueous electrolyte is poured into the reservoir member 170 from an inlet (not shown) formed in the lid part (thus, the electrode body 150 is impregnated with the non-aqueous electrolyte). Thereafter, the inlet is sealed off to thereby complete the non-aqueous electrolyte secondary battery 100 of the present embodiment.

MODIFIED EXAMPLE

In the above embodiment, the reservoir member 170 is a separate member from the battery casing 110. More specifically, the electrode body 150 is housed in the reservoir member 170 to thereby define the first reservoir space S1 and the second reservoir space S2.

On the other hand, in a non-aqueous electrolyte secondary battery 200 of this modified example, the reservoir member is not provided as a separate member from the battery casing 210 and a part of a battery casing 210 serves as a reservoir member.

The battery casing 210 of this modified example includes a reservoir member 211 housing the electrode body 150, and a lid part 212 (see FIGS. 13-17). The reservoir member 211 is different in shape from the rectangular housing part 111 of the foregoing embodiment. More specifically, the reservoir member 211 has an internal bottom surface 211f, a first inside surface 211b, a second inside surface 211c, a third inside surface 211d and a fourth inside surface 211e. The inner bottom surface 211f of the reservoir member 211 is of an arc-shaped cross section and has a form extending along an arc-shaped outer surface 150m of a lower arc-shaped part 150h in the axial direction of the electrode body 150 (in the extending direction of the axis AX, i.e., in the horizontal direction in FIG. 15) (see FIGS. 15 and 16). The inner bottom surface 211f is in contact with the lower arc-shaped part 150h of the electrode body 150 (see FIG. 16).

The first and the second inside surfaces 211b and 211c of the reservoir member 211 are flat surfaces facing each other. The first inside surface 211b has a form extending along a first outer surface 150r of a flattened part 150g of the electrode body 150 in the axial direction of the electrode body 150 (see FIGS. 16 and 17). The first inside surface 211b is in contact with the first outer surface 150r of the flattened part 150g (see FIG. 16). In addition, the second inside surface 211c has a form extending along a second outer surface 150s of a flattened part 150g of the electrode body 150 in the axial direction of the electrode body 150 (see FIGS. 16 and 17). The second inside surface 211c is in contact with the second outer surface 150s of the flattened part 150g (see FIG. 16).

The third and the fourth inside surfaces 211d and 211e of the reservoir member 211 are flat surfaces facing each other. The third inside surface 211d is face-to-face with a first end face 150j of the electrode body 150 and spaced with a clearance gap from the first end face 150j of the electrode body 150 (see FIG. 17). The fourth inside surface 211e is face-to-face with a second end face 150k of the electrode body 150 and spaced with a clearance gap from the second end face 150k of the electrode body 150.

Figure 17:
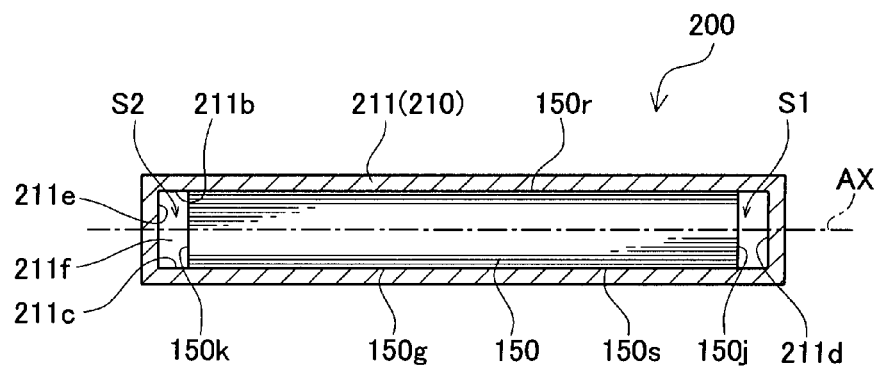
FIG. 17 is a horizontal cross sectional view of the non-aqueous electrolyte secondary battery, taken along a line H-H in FIG. 14, in the modified example.

In this modified example, the reservoir member 211 housing the electrode body 150 defines the first reservoir space S1 situated adjacent to the first end face 150j of the electrode body 150 (situated on the right-hand side of the first end face 150j in FIG. 17) (see FIGS. 15 and 17), as described above. More specifically, the first reservoir space S1 is enclosed and defined by the inner bottom surface 211f, the first inside surface 211b, the second inside surface 211c and the third inside surface 211d of the reservoir member 211 and the first end face 150j of the electrode body 150.

Figure 15:
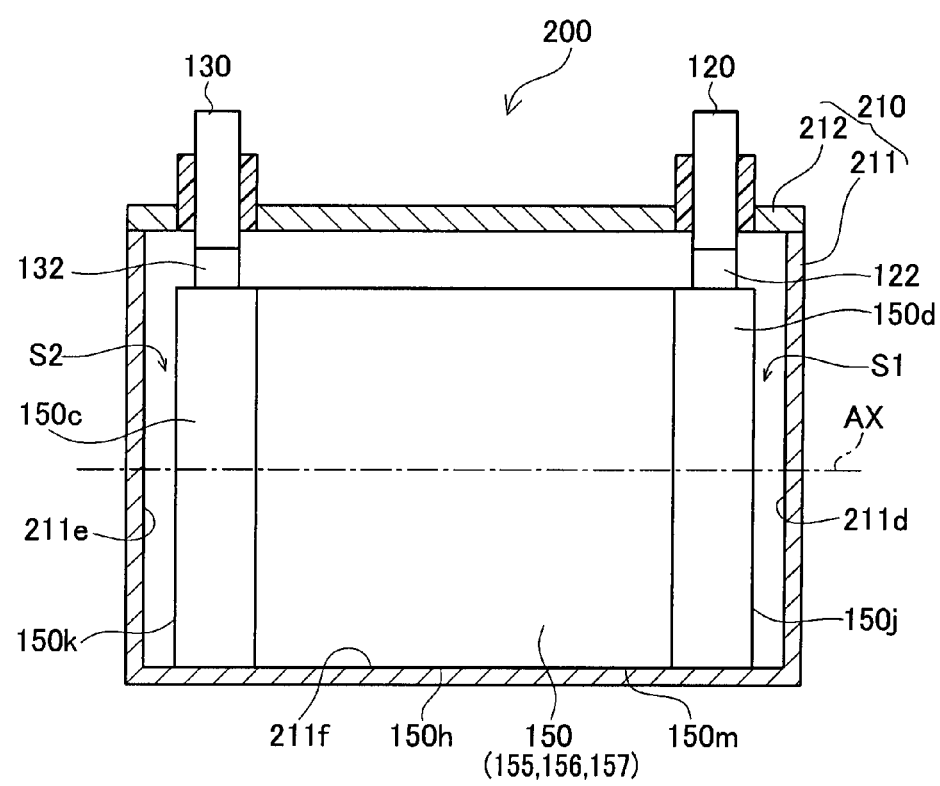
FIG. 15 is a vertical cross sectional view of the non-aqueous electrolyte secondary batter, taken along a line F-F in FIG. 13, in the modified example.

Further, the reservoir member 211 housing the electrode body 150 defines the second reservoir space S2 situated adjacent to the second end face 150k of the electrode body 150 (situated on the left-hand side of the second end face 150k in FIG. 17) (see FIGS. 15 and 17). More specifically, the second reservoir space S2 is enclosed and defined by the inner bottom surface 211f, the first inside surface 211b, the second inside surface 211c and the fourth inside surface 211e of the reservoir member 211 and the second end face 150k of the electrode body 150.

Figure 18:
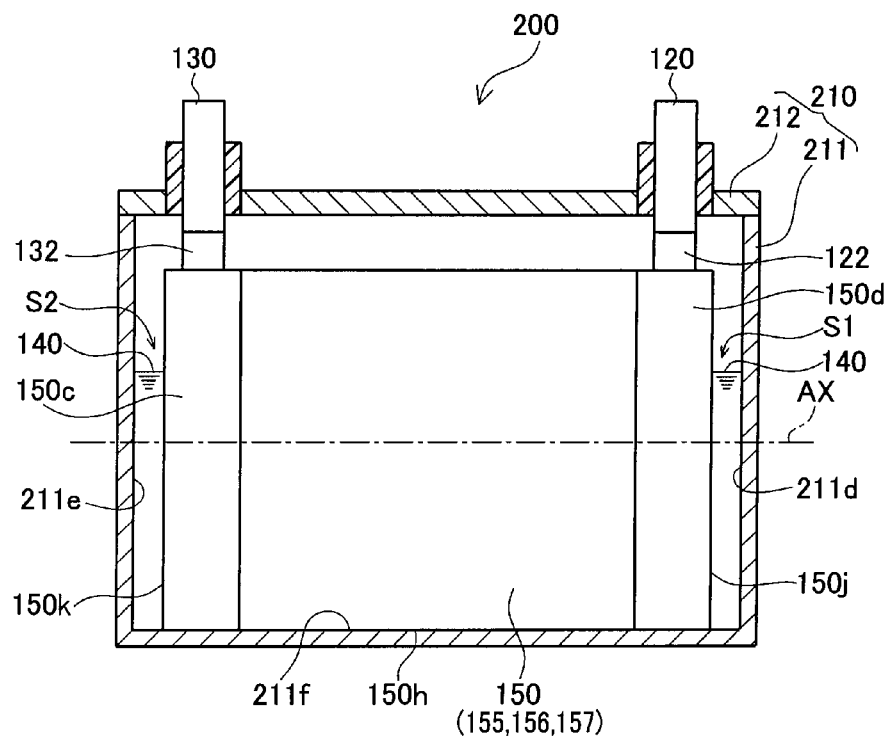
FIG. 18 is a view of the non-aqueous electrolyte secondary battery in a state where non-aqueous electrolyte is held in a first reservoir space and a second reservoir space in the modified example.

In the non-aqueous electrolyte secondary battery 200 of the present modified example, in the case where cycles of the high-rate current (high-rate) pulse charging/discharging are conducted thereby causing the non-aqueous electrolyte in the inside of the electrode body 150 to be forced out of the electrode body 150 through the clearance gaps in the first and the second end faces 150j and 150k of the electrode body 150, the non-aqueous electrolyte 140 thus forced out can be held in place in the first and the second reservoir spaces S1 and S2 (see FIG. 18), as in the non-aqueous electrolyte secondary battery 100 of the foregoing embodiment.

This makes it possible to place the forced out non-aqueous electrolyte 140 in a state of contact with the first end face 150j of the electrode body 150, thereby making it possible to thereafter bring back the forced-out non-aqueous electrolyte 140 into the electrode body 150 through the clearance gaps in the first end face 150j of the electrode body 150. Therefore, also according to the non-aqueous electrolyte secondary battery 200 of the present modified example, even when cycles of the high-rate current (high-rate) pulse charging/discharging are carried out, the decrease in amount of non-aqueous electrolyte (Li salt) in the electrode body 150 can be restrained, thereby making it possible to restrain the increase in battery internal resistance (for example, DC-IR), as in the non-aqueous electrolyte secondary battery 100 of the foregoing embodiment.

In the above, the present invention has been described in line with the foregoing embodiment and its modification. However, the present invention should not be construed to be limited in any way to these examples. Therefore, it is needless to say that the present invention may be modified appropriately and applicable within the scope not deviating from the present invention.

For example, PP (polypropylene) is used as a material for the reservoir member 170 in the foregoing embodiment employs. However, the material for the reservoir member 170 is not limited to polypropylene. PFA (tetrafluoroethylene-perfluoroalkylvinylether copolymer), PTFE (polytetrafluoroethylene), PET (polyethylene terephthalate), PPS (polyphenylene sulfide resin), PBT (polybutylene terephthalate) et cetera can be employed.

DESCRIPTION OF THE REFERENCE SIGNS 100, 200 Non-aqueous electrolyte secondary battery
110, 210 Battery casing
140 Non-aqueous electrolyte
150 Electrode body
150$j$ First end face
150$k$ Second end face
150$f$ Upper arc-shaped part
150$g$ Flattened part
150$h$ Lower arc-shaped part
150$m$ Arc-shaped outer surface
155 Positive electrode plate
156 Negative electrode plate
157 Separator
170, 211 Reservoir member
171, 211$b$ First inside surface
172, 211$c$ Second inside surface
173, 211$d$ Third inside surface
174, 211$e$ Fourth inside surface
175, 211$f$ inner bottom surface
S1 First reservoir space
S2 Second reservoir space

The invention claimed is:

1. A non-aqueous electrolyte secondary battery comprising:
   an electrode body including a positive electrode plate, a negative electrode plate, and a separator; and a non-aqueous electrolyte contained in the electrode body, wherein
   the non-aqueous electrolyte secondary battery further comprises a reservoir member which defines a reservoir space situated adjacent to an end face of the electrode body to hold therein the non-aqueous electrolyte forced out from inside to outside of the electrode body through a clearance gap in the end face of the electrode body,
   the electrode body is an electrode body formed by winding the positive electrode plate, the negative electrode plate, and the separator into a flattened form, and has an upper arc-shaped part constituting an upper end of the electrode body, a lower arc-shaped part constituting a lower end of the electrode body, and a flattened part situated between the upper arc-shaped part and the lower arc-shaped part,
   the reservoir member is a container for housing the electrode body, and has:
     an arc-shaped inner bottom surface extending along an arc-shaped outer surface of the lower arc-shaped part in an axial direction of the electrode body, wherein the arc-shaped inner bottom surface is in contact with the entire arc-shaped outer surface of the lower arc-shaped part without clearance gaps,
     a first and a second inside surface extending along an outer surface of the flattened part in the axial direction of the electrode body, wherein the outer surface of the flattened part includes a first outer surface and a second outer surface, an entire portion of the first outer surface facing the first inside surface of the reservoir member being in contact with the first inside surface of the reservoir member without clearance gaps, and an entire portion of the second outer surface facing the second inside surface of the reservoir member being in contact with the second inside surface of the reservoir member without clearance gaps, and
     a third inside surface and a fourth inside surface spacedly facing the end faces of the electrode body respectively,
   the end faces of the electrode body include a first end face facing the third inside surface and a second end face facing the fourth inside surface,
   the reservoir spaces include:
     a first reservoir space enclosed and defined by the inner bottom surface, the first inside surface, the second inside surface, the third inside surface, and the first end face of the electrode body; and
     a second reservoir space enclosed and defined by the inner bottom surface, the first inside surface, the second inside surface, the fourth inside surface, and the second end face of the electrode body.

2. The non-aqueous electrolyte secondary battery according to claim 1, wherein
   the secondary battery further includes a metallic battery casing,
   the reservoir member is a container for housing the electrode body and is formed of electric insulating resin,
   the reservoir member housing the electrode body is arranged in the battery casing.

* * * * *